US009104486B2

(12) United States Patent
Bontempi

(10) Patent No.: US 9,104,486 B2
(45) Date of Patent: Aug. 11, 2015

(54) APPARATUSES, SYSTEMS, AND METHODS FOR DISTRIBUTED WORKLOAD SERIALIZATION

(75) Inventor: Christopher Bontempi, Southington, CT (US)

(73) Assignee: McKesson Financial Holdings, Hamilton (BM)

( * ) Notice: Subject to any disclaimer, the term of this patent is extended or adjusted under 35 U.S.C. 154(b) by 707 days.

(21) Appl. No.: 13/291,291

(22) Filed: Nov. 8, 2011

(65) Prior Publication Data
US 2013/0117755 A1 May 9, 2013

(51) Int. Cl.
*G06F 9/46* (2006.01)
*G06F 9/50* (2006.01)

(52) U.S. Cl.
CPC ........ *G06F 9/5027* (2013.01); *G06F 2209/503* (2013.01); *G06F 2209/5021* (2013.01)

(58) Field of Classification Search
None
See application file for complete search history.

(56) References Cited

U.S. PATENT DOCUMENTS

| 7,127,507 | B1* | 10/2006 | Clark et al. | 709/224 |
|---|---|---|---|---|
| 7,243,351 | B2* | 7/2007 | Kundu | 718/102 |
| 8,595,301 | B2* | 11/2013 | Banks et al. | 709/206 |
| 2002/0174279 | A1* | 11/2002 | Wynne et al. | 710/113 |
| 2003/0187969 | A1* | 10/2003 | Wilcock | 709/223 |
| 2005/0038835 | A1* | 2/2005 | Chidambaran et al. | 707/203 |
| 2005/0171811 | A1* | 8/2005 | Campbell et al. | 705/1 |
| 2005/0232291 | A1* | 10/2005 | Brown et al. | 370/428 |
| 2006/0020678 | A1* | 1/2006 | Kessler et al. | 709/207 |
| 2006/0271663 | A1* | 11/2006 | Barillari et al. | 709/223 |
| 2006/0294045 | A1* | 12/2006 | Suggs et al. | 707/1 |
| 2007/0118608 | A1* | 5/2007 | Egli | 709/217 |
| 2008/0163249 | A1* | 7/2008 | Garza et al. | 719/314 |
| 2008/0307111 | A1* | 12/2008 | Wilcock | 709/242 |
| 2010/0005472 | A1* | 1/2010 | Krishnaraj et al. | 718/104 |
| 2010/0057880 | A1* | 3/2010 | Hasti et al. | 709/207 |
| 2010/0325640 | A1* | 12/2010 | Schofield et al. | 719/314 |
| 2011/0047154 | A1* | 2/2011 | Yang et al. | 707/736 |
| 2011/0193699 | A1* | 8/2011 | Van Acht et al. | 340/540 |
| 2011/0258628 | A1* | 10/2011 | Devadhar | 718/100 |
| 2011/0276636 | A1* | 11/2011 | Cheng et al. | 709/206 |

(Continued)

OTHER PUBLICATIONS

"Spring Framework—Wikipedia, the free encyclopedia"; [Online]; [Retrieved on Nov. 29, 2011]; Retrieved from the Internet <URL: http://en.wikipedia.org/wiki/Spring_Framework>; 9 sheets.

(Continued)

*Primary Examiner* — Emerson Puente
*Assistant Examiner* — Mehran Kamran
(74) *Attorney, Agent, or Firm* — Alston & Bird LLP

(57) ABSTRACT

Apparatuses, systems, methods, and computer program products are provided for processing workload requests in a distributed computing system. In general, a cooperative workload serialization system is provided that includes a Message Queue that is configured to receive and hold workload requests from a number of requestors and a Request Manager that is in communication with the Message Queue and is configured to direct the processing of the workload requests. The system may include a Culler in communication with the Request Manager, where the Culler is configured to monitor the validity of the workload requests. The Request Manager, in turn, may be configured to remove an indicated workload request from the Message Queue based on information from the Culler that the indicated workload request is not valid.

14 Claims, 6 Drawing Sheets

(56) References Cited

U.S. PATENT DOCUMENTS

2012/0290639 A1* 11/2012 Schofield et al. ............. 709/203
2014/0040401 A1* 2/2014 Banks et al. .................. 709/206

OTHER PUBLICATIONS

"Apache Zookeeper—Home"; [Online]; [Retrieved on Nov. 29, 2011]; Retrieved from the Internet <URL: http://zookeeper.apache.org/>; 2 sheets.

"Hazelcast—In-Memory Data Grid for Java—Google Project Hosting"; [Online]; [Retrieved on Nov. 29, 2011]; Retrieved from the Internet <URL: http://code.google.com/p/hazelcast/>; 1 sheet.

"Cacheonix Reliable Clustered Java Cache and In-Memory Data Grid"; [Online]; [Retrieved on Nov. 29, 2011]; Retrieved from the Internet <URL: http://cacheonix.com/products/cacheonix/index.htm>; 1 sheet.

* cited by examiner

APPARATUSES, SYSTEMS, AND METHODS FOR DISTRIBUTED WORKLOAD SERIALIZATION

BACKGROUND

Within any given application system, including a distributed system, different applications may request different functions to be performed for executing a particular operation or series of operations. The workload within the system must be controlled and coordinated to prevent concurrent processing of requests in certain situations, such as when one operation must be performed before another can take place.

Various tools exist for providing transaction control, in which individual bits of functionality are grouped together to be completed (or not) as a single unit. In addition, different types of software have been developed for providing data distribution platforms and the coordination of distributed applications; however, each of these systems has drawbacks.

Accordingly, there is a need in the art for an improved system and method for processing workload requests in a distributed system.

BRIEF SUMMARY OF THE INVENTION

Apparatuses, systems, methods, and computer program products are therefore provided for processing workload requests in a distributed system. Embodiments of the apparatuses, systems, methods, and computer program products provide for the serialization of workload requests in a distributed system, while at the same time allowing for the prioritization of certain requests within the framework of a first in-first out request order and providing for the automatic detection of stopped or failed processing of particular workload requests.

In one exemplary embodiment, a system for processing workload requests is provided that includes a message queue configured to receive and hold workload requests from a plurality of requestors and a request manager in communication with the message queue and configured to direct processing of the workload requests. The message queue may be configured to assign an order indication to each workload request based at least in part on an order in which the workload request is received by the message queue. Each workload request may include a designation of a coordination point indicative of a functionality required for processing of the workload request. The request manager may be configured to direct processing of a particular workload request based at least in part on the order indication of the particular workload request and an availability of the coordination point designated by the particular workload request.

In some cases, the system may include a culler in communication with the request manager. The culler may be configured to monitor the validity of workload requests, and the request manager may be configured to remove an indicated workload request from the message queue based on information from the culler that the indicated workload request is not valid. Each requestor may be configured to establish a network connection with a network port of the system for communicating a respective workload request to the request manager and for processing of the workload requests, and the culler may be configured to monitor a validity of the network port associated with each requestor. The request manager may be configured to remove an indicated workload request from the message queue based on information from the culler that a network port associated with a requestor of the indicated workload request is not valid. Moreover, the request manager may be configured to determine an availability of a particular coordination point based on information from the culler that a network port associated with a requestor of a workload request designating the particular coordination point is not valid.

The request manager may be configured to receive a communication from each requestor indicating an availability of the coordination point designated in the corresponding workload request upon completion of processing of the respective workload request. The message queue may be configured to assign the order indication based on the order in which the workload request is received and an indicated priority of the workload request. Furthermore, the request manager may be configured to receive an inquiry from a requestor regarding an availability of a particular coordination point and to communicate a response to the inquiry.

The request manager may be configured to remove a particular workload request from the message queue based on an expiration of the particular workload request in some embodiments. The request manager may further be configured to determine a type of access required by each workload request and to direct concurrent processing of more than one workload request in the message queue designating the same coordination point for which shared access is determined. The coordination point may comprise an arbitrary value that is independent of a computer language or operating environment.

In other embodiments, a method for processing workload requests in a distributed system is provided. The method and computer program product provide for communication with a message queue that is configured to receive and hold workload requests, and directing the processing of each workload request. The workload requests may be received from a plurality of requestors, and each workload request may include a designation of a coordination point indicative of a functionality required for processing of the workload request. Furthermore, an order indication may be assigned to each workload request based at least in part on an order in which the workload request is received by the message queue. Thus, processing of each workload request may be directed based at least in part on the order indication of the particular workload request and an availability of the coordination point designated by the particular workload request.

In some cases, an indicated workload request may be removed from the message queue based on information that the indicated workload request is not valid. For example, an indicated workload request may be removed from the message queue based on information that a network port associated with a requestor of the indicated workload request is not valid. Also, an availability of a particular coordination point may be determined based on information that a network port associated with a requestor of a workload request designating the particular coordination point is not valid.

An availability of a particular coordination point may be determined based on information that a network port associated with a requestor of a workload request designating the particular coordination point is not valid. A communication may be received from each requestor indicating an availability of the coordination point designated in the corresponding workload request upon completion of processing of the respective workload request. In addition, the order indication may be assigned based on the order in which the workload request is received by the message queue and an indicated priority of the workload request. In some cases, an inquiry may be received from a requestor regarding an availability of a particular coordination point, and a response may be communicated to the inquiry.

In some cases, a particular workload request may be removed from the message queue based on an expiration of the workload request. Furthermore, the method and computer program product may include determining a type of access required by each workload request and directing concurrent processing of more than one workload request in the message queue designating the same coordination point for which shared access is determined. The coordination point may include an arbitrary value that is independent of computer language therein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
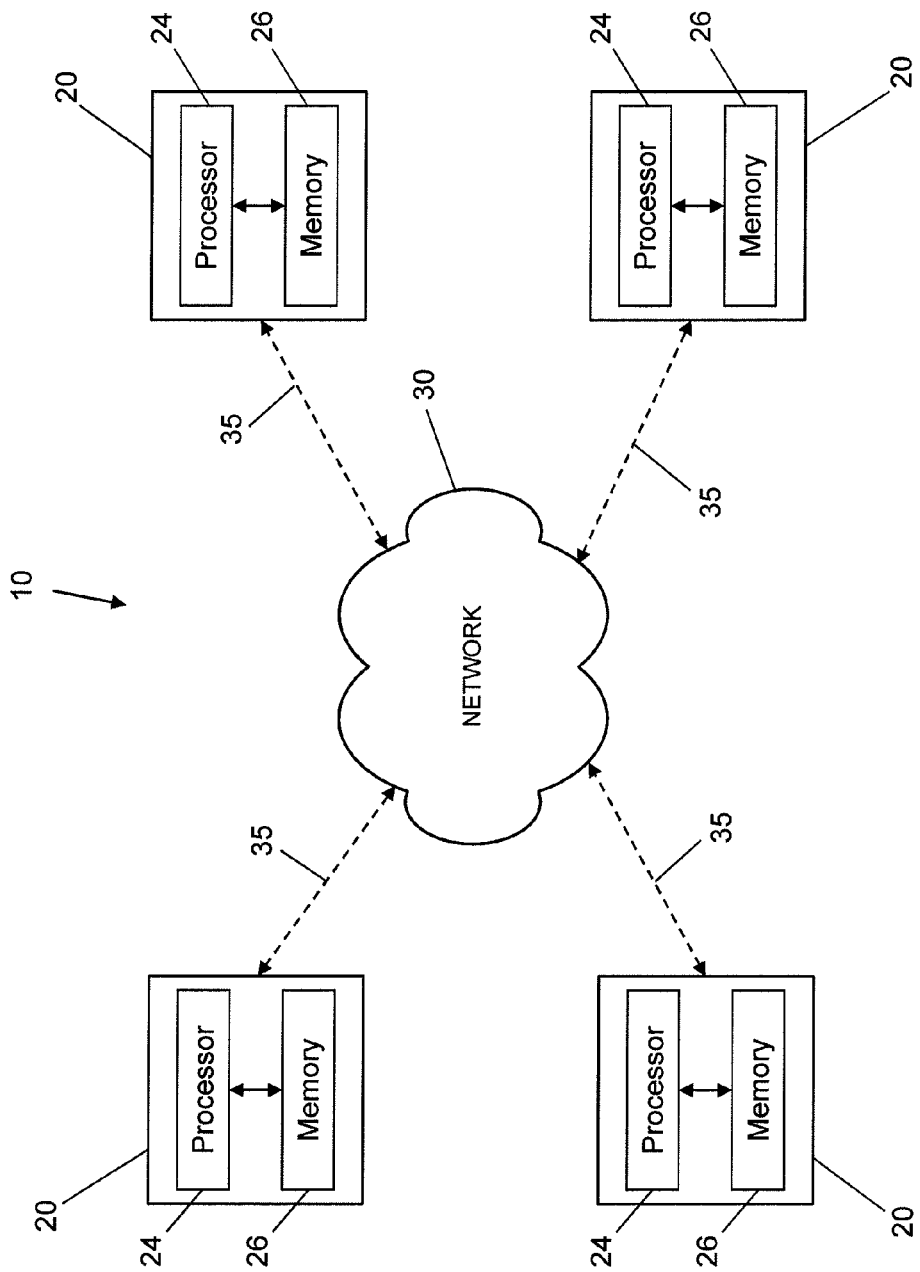
FIG. 1 illustrates a network environment of a distributed system in accordance with one exemplary embodiment.

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout.

A distributed computing system is a system in which multiple computers can communicate and interact with each other through a computer network, such as the Internet, to achieve a common goal. For example, with reference to FIG. 1, a distributed system 10 is shown that includes four computers 20 (e.g., server computers or user terminals) that can communicate with each other and with other network devices (not shown) via a network 30. In this regard, each computer 20 may simply be an apparatus that includes at least a processor 24 and a memory 26.

Each computer 20 may require certain tasks to be completed in order to execute certain operations. These tasks, generally referred to as workload requests, may need to be processed at the same computer 20 that issued the request (generally denoted as the requestor), at a different computer in communication with the requestor, or at a different network device (e.g., a database residing in a memory on the network). To enable communication between the particular requestor and other computers and devices on the network 30, each requestor may be configured to establish a network connection 35 with a network port (not shown), over which communications may be received and transmitted.

Because the system 10 is a distributed system, the workload requests within the system must be serialized (e.g., ordered in series, one after the other) such that certain instances of concurrency are prevented. In other words, in cases in which one workload request (e.g., a "write" request for writing data to a particular database) must be carried out after another workload request (e.g., a "read" request for reading data to the same database), the processing of both workload requests concurrently should be precluded. In addition, prioritization of certain requests over others that may have been received earlier, while generally maintaining a first in-first out ordering structure may be beneficial for processing certain requests that may have a higher priority than other requests in those limited cases.

Accordingly, embodiments of a system and method are described herein for processing workload requests in a distributed system. In general, a cooperative workload serialization system is provided that serializes mutually exclusive distributed work requests among processes running on 1 to n systems. Turning to FIG. 2, embodiments of the system 100 may comprise a Message Queue 110 that is configured to receive and hold workload requests (e.g., WR1, WR2, etc.) from a plurality of requestors (such as, e.g., the Requestors shown in FIG. 1) and a Request Manager 120 that is in communication with the Message Queue 110 and is configured to direct the processing of the workload requests.

In this regard, the Message Queue 110 may be configured to assign an order indication 125 to each workload request based at least in part on an order in which the workload request is received by the Message Queue. For example, the Message Queue 110 may be configured to order the workload requests according to a first in-first out protocol, in which the first workload request received by the queue becomes the first request processed.

In some embodiments, however, a workload request may include an indication of priority 130. Thus, the Message Queue 110 may be configured to assign the order indication 125 based on the order in which the workload request is received and the indicated priority 130 of the workload request. Referring to the example depicted in FIG. 2, the first workload request in the queue, WR1, may have been assigned an order indication 125 of 1 because it was indicated as being a priority request 130, even though other workload requests, such as WR2 and WR3 may have been received before WR1. If another workload request (e.g., WR8, not shown) is received after WR7, but includes an indication of priority, this workload request may be moved ahead of WR2 through WR7 and may be assigned an order indication of 2. WR8 would, in effect, "jump the line" with respect to WR2 through WR7. With respect to WR1, which also includes an indication of priority 130, however, WR8 would be assigned an order indication 125 that follows the order indication assigned to WR1 because WR1 was first-in with respect to WR8.

Figure 2:
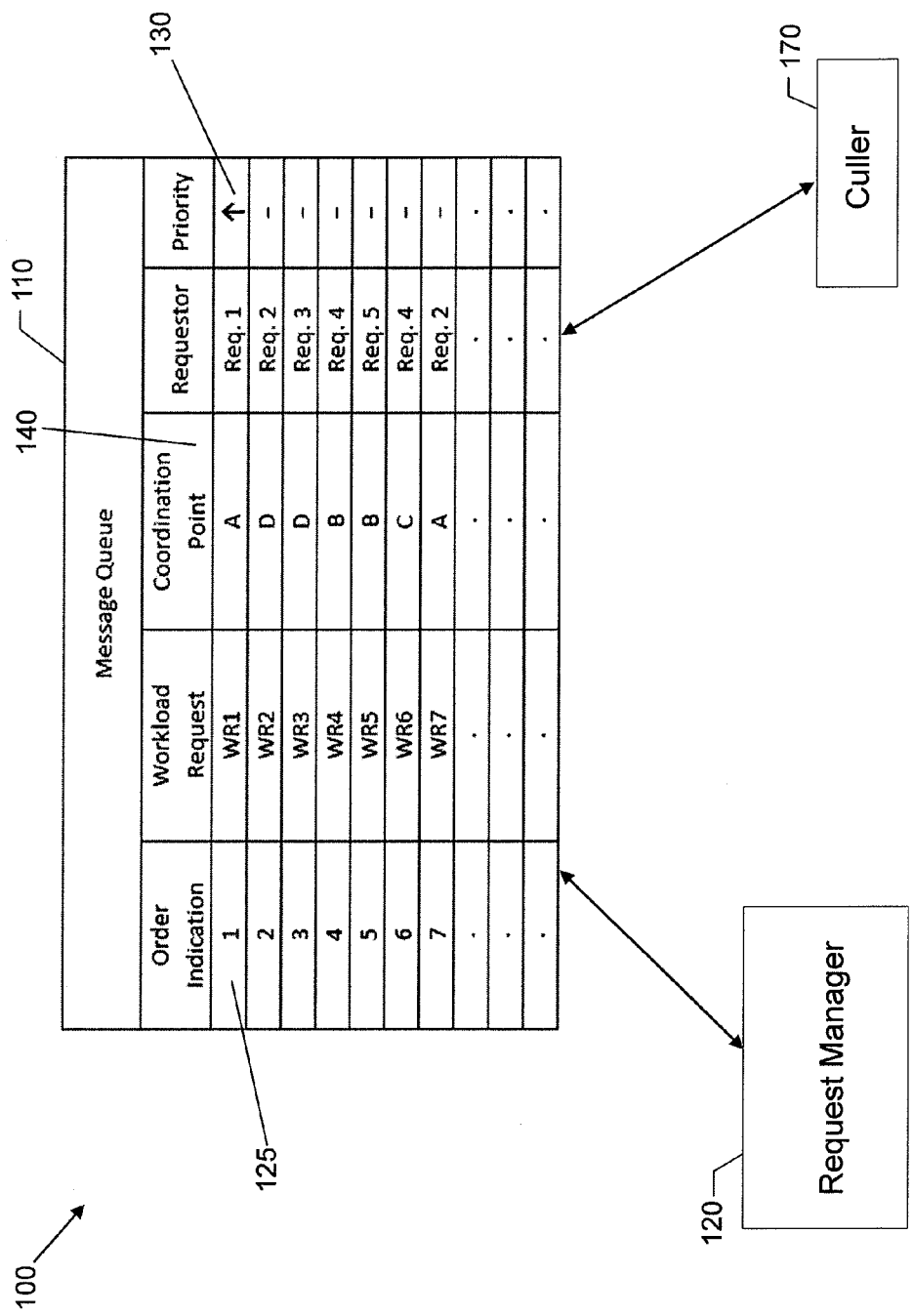
FIG. 2 illustrates a system including a Message Queue, a Request Manager, and a Culler in accordance with one exemplary embodiment of the present invention.

The request mechanism (e.g., the process by which a Requestor can provide a workload request to the Message Queue) may be implemented in various ways, for example, as a Web Service such that the process is available to any Requestors on the same network that can act as a Web Service Client (e.g., the Network 30 of FIG. 1). In some embodiments, the Message Queue 110 may be a database table, such as an Oracle® database table, and the serialization and prioritization of the workload requests (e.g., the process of assigning order indications to the workload requests) may be accomplished using Oracle® Active Queuing. In other embodiments, however, any messaging service may be used to provide a Message Queue 110, including custom-designed messaging services.

With continued reference to FIG. 2, each workload request may include a designation of a coordination point 140 indicative of a functionality required for processing of the workload request. The coordination point may comprise an arbitrary value that is independent of computer language or computing environment. For example, the coordination point may be an arbitrary identifier that two or more applications agree upon in advance for describing a place where programs converge. As such, the coordination point need not be a network device or object that actually exists (e.g., the coordination point may not be an object to be created or maintained) and may not be tied to a particular computing language, environment, or application. Rather, the coordination point may simply be an identifier (e.g., a name) that describes the application, database, etc. that will be called upon to process and complete a particular workload request. Thus, in FIG. 2, the Message Queue 110 has received and is holding at least seven workload requests received from a number of different (and some the same) Requestors, where the workload requests designate a coordination point (A-D in the depicted example) associated with the particular workload request. The Request Manager 120, in turn, may be configured to direct processing of a particular workload request based at least in part on the order indication of the particular workload request, as well as on an availability of the coordination point designated by the particular workload request.

Accordingly, each time a workload request is granted by the Request Manager, the entry in the Message Queue 110 for that particular workload request is removed and the coordination point designated by the particular workload request may be indicated as reserved by the corresponding Requestor, such that other workload requests designating the same coordination point may not be able to have their workload requests completed until the coordination point becomes available again. In this way, concurrent operations that could potentially corrupt data may be precluded.

Figure 3:
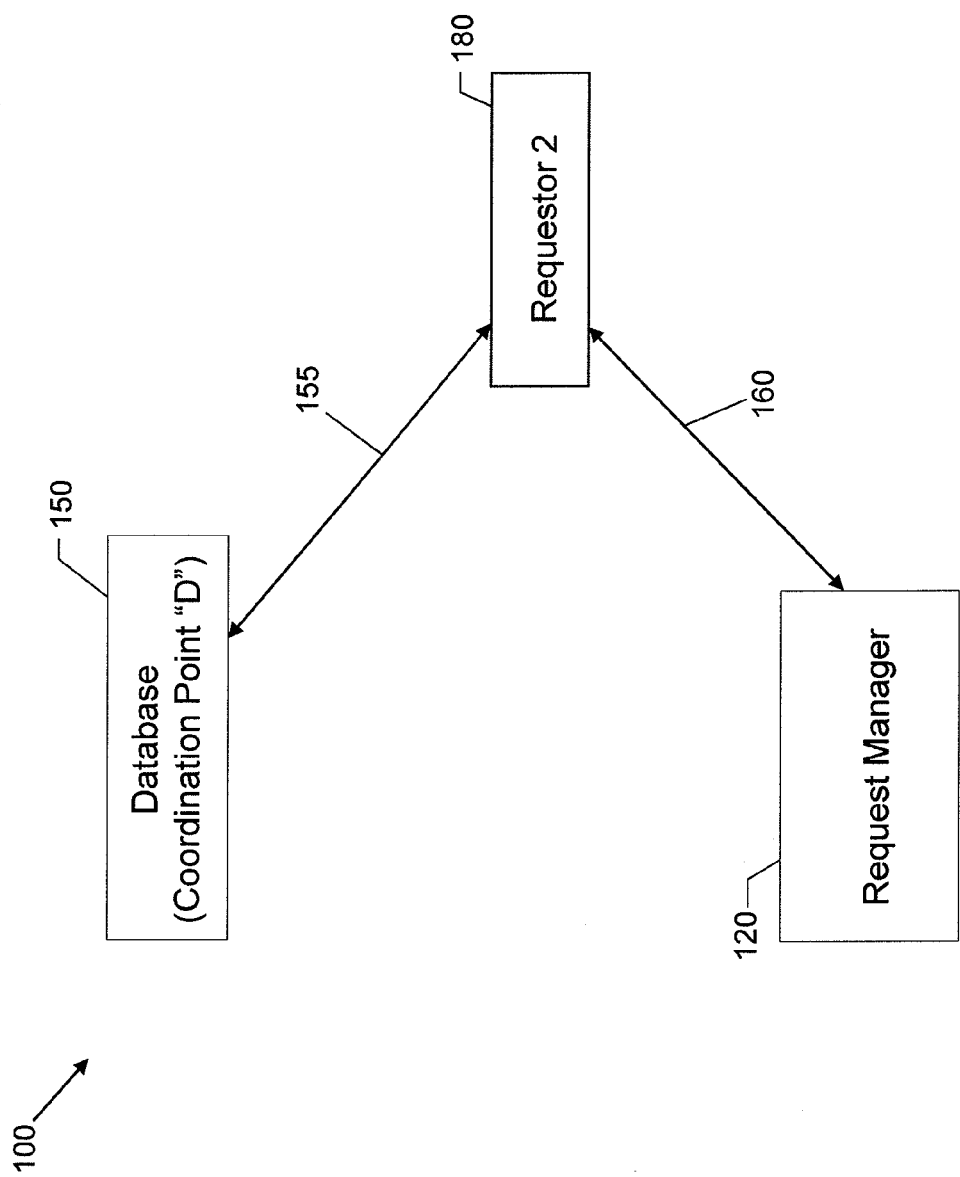
FIG. 3 illustrates communication between a Requestor, a database, and a Request Manager in the system of FIG. 2 in accordance with one exemplary embodiment of the present invention.

As an example, with reference to FIGS. 2 and 3, WR2 may be a read operation, and WR3 may be a write operation. Both operations may be with respect to the same data, such as data in the same database 150, and thus each of these workload requests may designate the same coordination point 140 (coordination point D). Because conducting a read operation and a write operation of the same data may corrupt the data or otherwise produce undesirable results, these two workload requests WR2 and WR3 may be serialized and assigned order indications of 2 and 3, respectively. Thus, when WR2 is granted and the associated Requestor 2 is accessing the database corresponding to the designated coordination point D (shown by the arrow 155 in FIG. 3), the coordination point D may be unavailable to other workload requests designating the same coordination point, such as WR3. Once WR2 has been carried out and Requestor 2 is no longer in need of the database 150 corresponding to coordination point D, Requestor 2 may communicate to the Request Manager 120 that the respective coordination point is now available (depicted by the arrow 160 in FIG. 3). Thus, the Request Manager 120 may be configured to receive a communication 160 from each Requestor 180 (such as Requestor 2 in this example) indicating an availability of the coordination point designated in the corresponding workload request (e.g., WR2) upon completion of processing of the respective workload request. Upon determining that a particular coordination point (such as D) is available, the Request Manager 120 may direct the next workload request in the Message Queue 110 designating that particular coordination point to access the corresponding functionality to carry out the workload request (in this case, directing WR3 to access the database for executing the write operation).

In some embodiments, the Request Manager 120 may be configured to determine a type of access required by each workload request and to direct concurrent processing of more than one workload request in the Message Queue 110 designating the same coordination point for which shared access is determined. For example, in another case in which both workload requests WR2 and WR3 are for read operations of the same database, the Request Manager 120 may determine that the two read operations of WR2 and WR3 do not require exclusive access to the functionality described by the coordination point, but instead may have shared access. In other words, in this example, access to the database 140 by both Requestor 2 and Requestor 3 may overlap. Accordingly, the Request Manager may direct processing of both WR2 and WR3 concurrently (e.g. at the same time or nearly the same time, such that access to the functionality described by the designated coordination point at least partially overlaps).

In some cases, the Request Manager 120 may be configured to receive an inquiry from a Requestor 180 regarding an availability of a particular coordination point. For example, Requestor 6 (not shown in FIG. 2) may transmit an inquiry to the Request Manager 120 asking about whether a particular coordination point (e.g., coordination point D) is available. The Request Manager 120 may in turn be configured to communicate a response to the inquiry. Thus, in the case where the coordination point D is not available (e.g., because the corresponding database is being accessed by another Requestor 180 that requires exclusive access), the Request Manager 120 may so notify the inquiring Requestor 6. Requestor 6 may then determine whether to enter the Message Queue 110 and wait for access to the designated coordination point according to, among other things, its assigned order indication. In some cases, Requestor 6 may not enter the Message Queue and may either abandon its workload request or take other actions to have the workload request carried out (e.g., designate a different coordination point or indicate a higher priority) based on the response received from the Request Manager 120.

In still other cases, the Request Manager 120 may be configured to remove a particular workload request from the Message Queue 110 based on an expiration of the particular workload request. For example, a certain workload request may include an expiration, such as a date, time, or maximum duration in the Message Queue 110. Upon expiration of the workload request, the Request Manager 120 may be configured to remove the corresponding workload request from the Message Queue, such that the subsequent workload request in the Message Queue would be assigned the next best order indication (effectively moving everyone in the Message Queue following the particular workload request ahead in the order).

In some embodiments, the validity of a workload request may be determined, such that workload requests that are no longer valid may be removed from the Message Queue to make room for other, valid, workload requests. In this regard, the system 100 shown in FIG. 2 may include a Culler 170 in communication with the Request Manager 120. The Culler 170 may be configured to monitor validity of the workload requests, and the Request Manager 120, in turn, may be configured to remove an indicated workload request from the Message Queue 110 based on information from the Culler 170 that the indicated workload request is not valid.

For example, each Requestor 180 may be configured to establish a network connection with a network port of the system 100, as noted above, for communicating with the Request Manager 120 regarding processing of respective workload requests. If the coordination point designated by the workload request is not available, the Request Manager 120 may then communicate the workload request to the Message Queue 110, where it is assigned an order indication as described above. The Culler 170 may be configured to monitor a validity of the network port associated with each Requestor 180, such that if the particular network connection fails for some reason and the Requestor 180 is no longer connected to the system 100, this information may be relayed to the Request Manager 120. The Request Manager 120 may thus be configured to remove an indicated workload request from the Message Queue 110 based on information from the Culler 170 that a network port associated with the Requestor 180 of the indicated workload request is not valid.

Similarly, the Request Manager 120 may be configured to determine an availability of a particular coordination point based on information from the Culler 170 that a network port associated with a Requestor 180 of a workload request designating the particular coordination point is not valid. In other words, if while carrying out the workload request the particular Requestor 180 loses its connection with the functionality described by the designated coordination point, the Culler 170 would convey this information to the Request Manager 120, which would thus determine that the coordination point has been freed up and is now available for the next Requestor designating that particular coordination point. In this way, the Request Manager 120 can direct the processing of workload requests in an efficient manner, and delays in processing due to failed network connections of Requestors with order indications that are ahead of other workload requests do not cause substantial delays in the processing of workload requests farther down the list.

Figure 4:
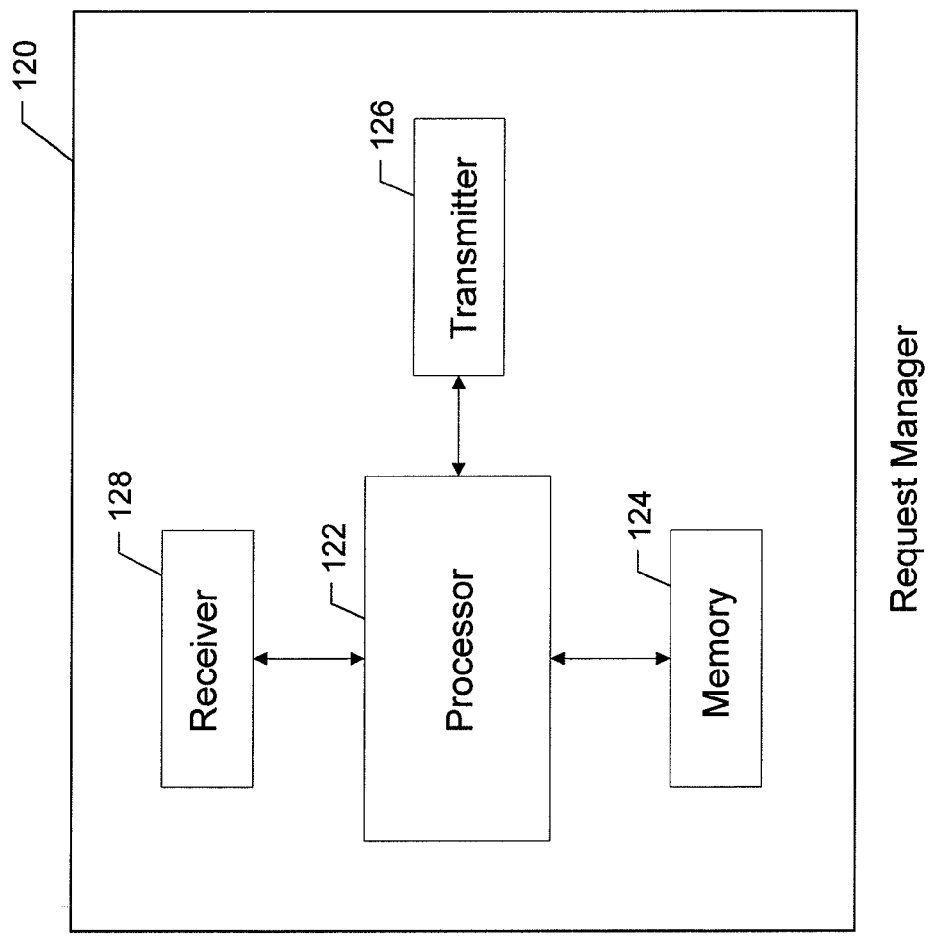
FIG. 4 is a schematic representation of the Request Manager of FIG. 2 in accordance with one exemplary embodiment of the present invention.
Figure 5:
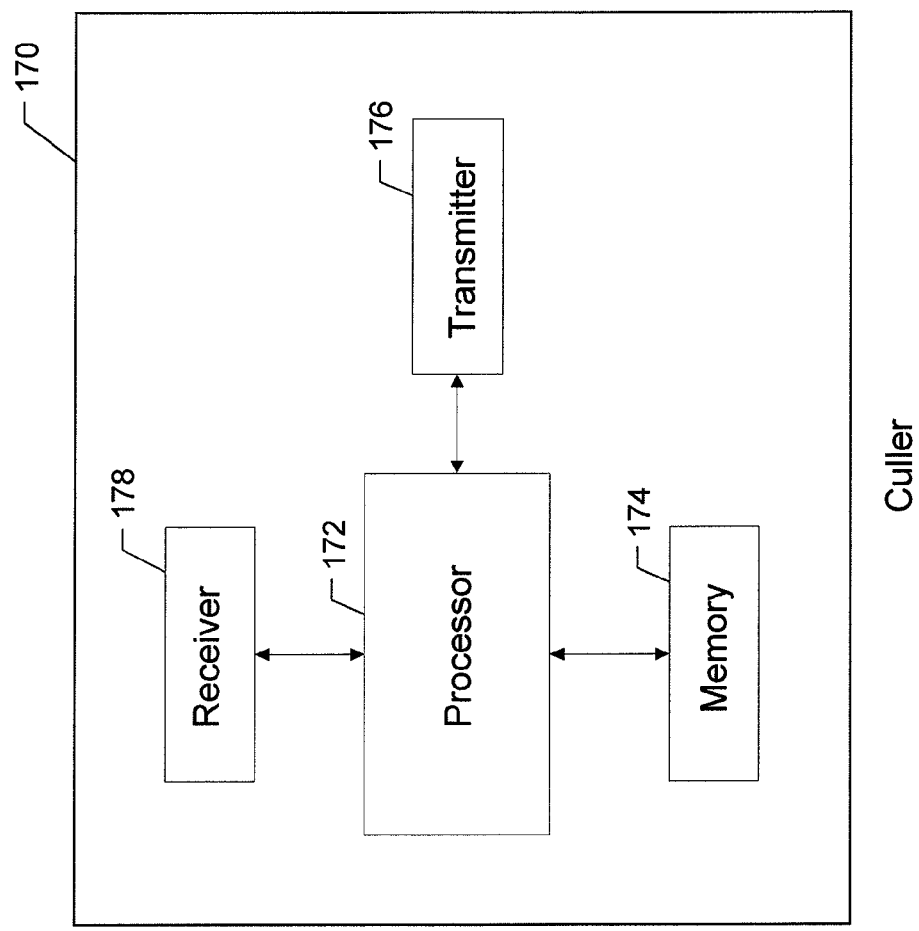
FIG. 5 is a schematic representation of the Culler of FIG. 2 in accordance with one exemplary embodiment of the present invention.

Referring now to FIGS. 4 and 5, the Request Manager 120 and the Culler 170 described above may be embodied in several ways and configured to have the functionality described above. For example, the Request Manager 120 and the Culler 170 may be embodied by a server, a lower-level computing device including a processor, or any other type of computing device specifically configured to perform the functions described herein. As shown in FIGS. 4 and 5, for example, each of the Request Manager 120 and the Culler 170 may include a processor 122, 172. The processor 122, 172 may be configured to communicate with a memory 124, 174, a transmitter 126, 176, and a receiver 128, 178, any one of which may be included in the Request Manager 120 and/or the Culler 170 or embodied in another device accessible to the processor 122, 172, respectively.

In this regard, the transmitter 126 of the Request Manager 120 may be configured to transmit signals, which may include data directing the processing of one or more of the workload requests in the Message Queue. The receiver 128 of the Request Manager 120 may similarly be configured to receive signals, such as signals from the Culler 170 carrying data regarding the validity of a workload request and/or signals from a Requestor 180 regarding the availability of a coordination point.

The transmitter 176 of the Culler 170 may be configured to transmit signals, such as signals carrying data regarding the validity of a workload request and/or information regarding a monitored network port or network connection. Likewise, the receiver 178 of the Culler 170 may be configured to receive signals, such as signals from the Request Manager 120 and/or from particular Requestors 180 regarding the processing of workload requests. As noted above, one or both of the Request Manager 120 and the Culler 170 include at least a processor 122, 172, but may also include one or more of a memory 124, 174, transmitter 126, 176, and receiver 128, 178.

Figure 6:
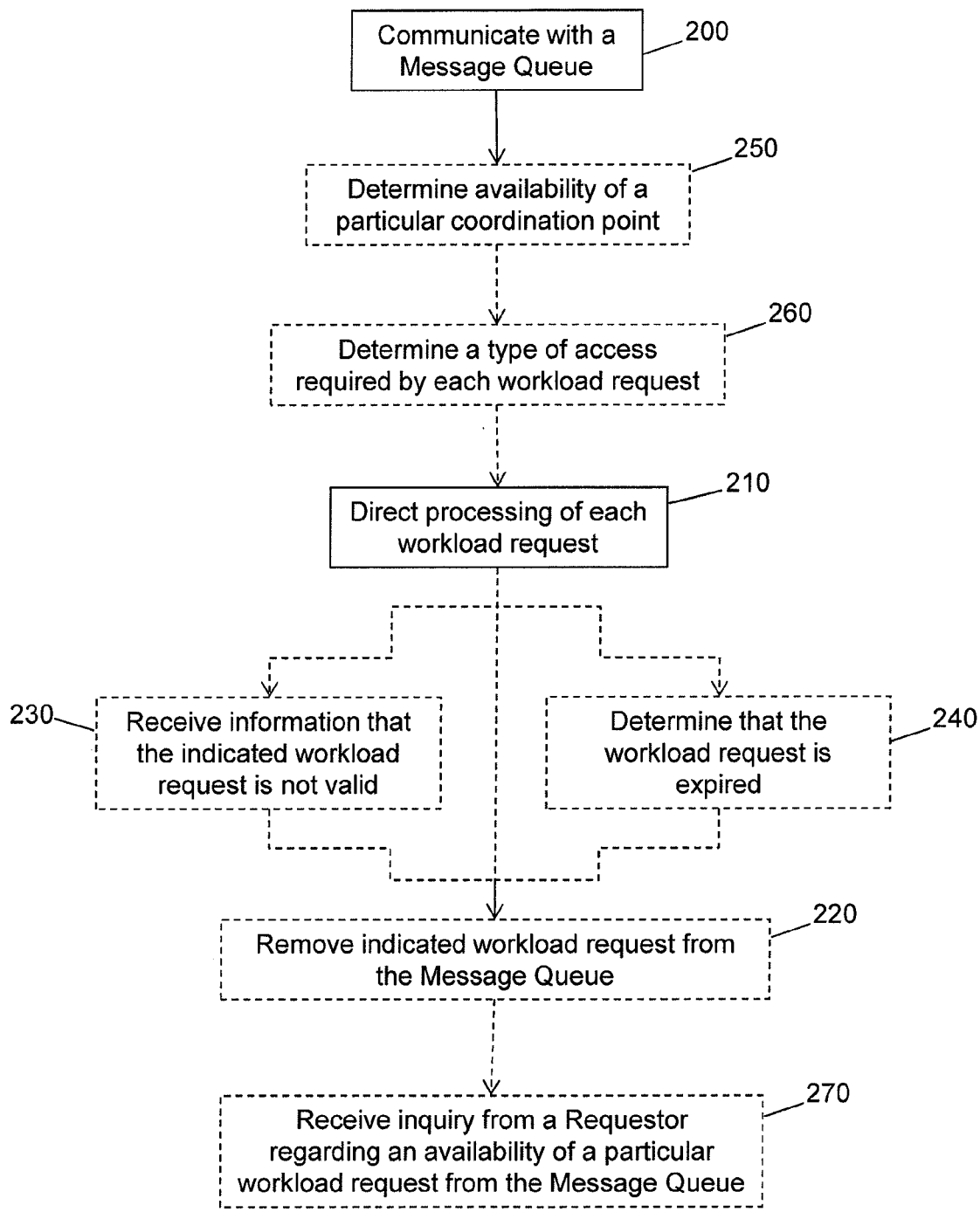
FIG. 6 is a flow chart illustrating a method of processing workload requests in a distributed system according to an exemplary embodiment of the present invention.

Referring to FIG. 6, embodiments of a method of processing workload requests in a distributed system may thus be provided. According to embodiments of the method, communication with a Message Queue may take place at Block 200, wherein the Message Queue is configured to receive and hold workload requests. The workload requests may be received from a plurality of requestors, and each workload request may include a designation of a coordination point indicative of a functionality required for processing of the workload request, as described above. An order indication may be assigned to each workload request based at least in part on an order in which the workload request is received by the Message Queue. Processing of each workload request may be directed at Block 210 based at least in part on the order indication of the particular workload request and an availability of the coordination point designated by the particular workload request. The order indication may, in some cases, be assigned to each workload request based at least in part on an order in which the workload request is received by the Message Queue and an indicated priority of the workload request. As noted above, the coordination point may comprise an arbitrary value that is independent of a computer language or operating environment.

In some cases, an indicated workload request may be removed from the Message Queue at Block 220 for several reasons. For example, the indicated workload request may be removed based on information that the indicated workload request is not valid, or the indicated workload request may be removed based on information that a network port associated with a Requestor of the indicated workload request is not valid at Block 230. Moreover, a particular workload request may be removed from the Message Queue based on an expiration of the workload request at Block 240, as described above.

In some embodiments, an availability of a particular coordination point may be determined at Block 250. The determination may be made based on information that a network port associated with a Requestor of a workload request designating the particular coordination point is not valid. In other embodiments, a communication from each Requestor may be received indicating an availability of the coordination point designated in the corresponding workload request upon completion of processing of the respective workload request. In addition, a type of access required by each workload request may be determined at Block 260, such as shared access or exclusive access. Where the type of access is determined to be shared access, concurrent processing of more than one workload request in the Message Queue designating the same coordination point may be directed. Moreover, an inquiry may be received from a Requestor regarding an availability of a particular coordination point, and a response to the inquiry may be communicated at Block 270, as described above.

Accordingly, embodiments of the invention provide a system for the serialization of workload requests in a distributed system, while at the same time allowing for the prioritization of certain requests within the framework of a first in-first out request order and providing for the automatic detection of stopped or failed processing of particular workload requests.

Exemplary embodiments of the present invention have been described above with reference to block diagrams and flowchart illustrations of methods, apparatuses (e.g., systems) and computer program products. In some embodiments, certain ones of the operations above may be modified or further amplified as described below. Furthermore, in some embodiments, additional optional operations may be included, some examples of which are shown in dashed lines in FIG. 6. Modifications, additions, or amplifications to the operations above may be performed in any order and in any combination.

It will be understood that each operation, action, step and/or other types of functions shown in the diagram (FIG. 6), and/or combinations of functions in the diagram, can be implemented by various means. Means for implementing the functions of the flow diagram, combinations of the actions in the diagrams, and/or other functionality of example embodiments of the present invention described herein, may include hardware and/or a computer program product including a computer-readable storage medium (as opposed to or in addition to a computer-readable transmission medium) having one or more computer program code instructions, program instructions, or executable computer-readable program code instructions stored therein.

For example, program code instructions associated with FIG. 6 may be stored on one or more storage devices, such as a memory 124 of the Request Manager 120, and executed by one or more processors, such as processor 122, shown in FIG. 5. Additionally or alternatively, one or more of the program code instructions discussed herein may be stored and/or performed by distributed components, such as those discussed in connection with system 100. As will be appreciated, any such program code instructions may be loaded onto computers, processors, other programmable apparatuses or network thereof from one or more computer-readable storage mediums to produce a particular machine, such that the particular machine becomes a means for implementing the functions of the actions discussed in connection with, e.g., FIG. 6 and/or the other drawings discussed herein. As such, FIG. 6 showing data flows may likewise represent program code instructions that may be loaded onto a computer, processor, other programmable apparatus or network thereof to produce a particular machine.

The program code instructions stored on the programmable apparatus may also be stored in a nontransitory computer-readable storage medium that can direct a computer, a processor (such as processor 122) and/or other programmable apparatus to function in a particular manner to thereby generate a particular article of manufacture. The article of manufacture becomes a means for implementing the functions of the actions discussed in connection with, e.g., FIG. 6. The program code instructions may be retrieved from a computer-readable storage medium and loaded into a computer, processor, or other programmable apparatus to configure the computer, processor, or other programmable apparatus to execute actions to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel by one or more machines, such that multiple instructions are retrieved, loaded, and/or executed together. Execution of the program code instructions may produce a computer-implemented process such that the instructions executed by the computer, processor, other programmable apparatus, or network thereof provides actions for implementing the functions specified in the actions discussed in connection with, e.g., the process illustrated in FIG. 6.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for processing workload requests comprising:
a message queue configured to receive and hold workload requests from a plurality of requestors;
a request manager associated with a processor, the request manager being in communication with the message queue and configured to direct processing of the workload requests; and
a culler in communication with the request manager, wherein the culler is configured to monitor validity of workload requests,
wherein the message queue is configured to assign an order indication to each workload request based on an order in which the workload request is received by the message queue and, in an instance in which the workload request includes an indication of priority, further based on the indication of priority, such that the order indication prioritizes the workload requests within a first in-first out framework,
wherein each workload request includes a designation of a coordination point indicative of a functionality required for processing of the workload request,
wherein the culler is configured to monitor the validity of the workload requests by monitoring a network connection between the requestor of the respective workload request and at least one of the request manager or the respective designated coordination point, and
wherein the request manager is configured to direct processing of a particular workload request based at least in part on the assigned order indication of the particular workload request, an availability of the coordination point designated by the particular workload request, and information received from the culler, and
wherein each requestor is configured to establish a network connection with a network port of the system for communicating a respective workload request to the request manager and for processing of the workload requests, wherein the culler is configured to monitor a validity of the network port associated with each requestor, and wherein the request manager is configured to remove an indicated workload request from the message queue based on information from the culler that a network port associated with a requestor of the indicated workload request is not valid.

2. The system of claim 1, wherein the request manager is configured to determine an availability of a particular coordination point based on information from the culler that a network port associated with a requestor of a workload request designating the particular coordination point is not valid.

3. The system of claim 1, wherein the request manager is configured to receive a communication from each requestor indicating an availability of the coordination point designated in the corresponding workload request upon completion of processing of the respective workload request.

4. The system of claim 1, wherein the request manager is configured to receive an inquiry from a requestor regarding an availability of a particular coordination point and to communicate a response to the inquiry.

5. The system of claim 1, wherein the request manager is configured to remove a particular workload request from the message queue based on an expiration of the particular workload request.

6. The system of claim 1, wherein the request manager is configured to determine a type of access required by each workload request and to direct concurrent processing of more than one workload request in the message queue designating the same coordination point for which shared access is determined.

7. The system of claim 1, wherein the coordination point comprises an arbitrary value that is independent of a computer language or operating environment.

8. A method for processing workload requests in a distributed system comprising:

communicating with a message queue, wherein the message queue is configured to receive and hold workload requests, wherein the workload requests are received from a plurality of requestors, wherein each workload request includes a designation of a coordination point indicative of a functionality required for processing of the workload request, and wherein an order indication is assigned to each workload request based on an order in which the workload request is received by the message queue and, in an instance in which the workload request includes an indication of priority, further based on the indication of priority, such that the order indication prioritizes the workload requests within a first in-first out framework;

communicating with a culler configured to monitor validity of workload requests, wherein the culler is configured to monitor the validity of the workload requests by monitoring a network connection with the requestor of the respective workload request or a network connection between the requestor and the respective designated coordination point; and directing processing of each workload request based at least in part on the assigned order indication of the particular workload request, an availability of the coordination point designated by the particular workload request, and information received from the culler; and removing an indicated workload request from the message queue based on information received from the culler that a network port associated with a requestor of the indicated workload request is not valid.

9. The method of claim 8 further comprising determining an availability of a particular coordination point based on information received from the culler that a network port associated with a requestor of a workload request designating the particular coordination point is not valid.

10. The method of claim 8 further comprising receiving a communication from each requestor indicating an availability of the coordination point designated in the corresponding workload request upon completion of processing of the respective workload request.

11. The method of claim 8 further comprising receiving an inquiry from a requestor regarding an availability of a particular coordination point and communicating a response to the inquiry.

12. The method of claim 8 further comprising removing a particular workload request from the message queue based on an expiration of the workload request.

13. The method of claim 8 further comprising determining a type of access required by each workload request and directing concurrent processing of more than one workload request in the message queue designating the same coordination point for which shared access is determined.

14. The method of claim 8, wherein the coordination point comprises an arbitrary value that is independent of a computer language or operating environment.

* * * * *